United States Patent

[11] 3,624,435

[72] Inventor James E. Bunner
 Erie, Pa.
[21] Appl. No. 64,110
[22] Filed July 29, 1970
[45] Patented Nov. 30, 1971
[73] Assignee General Electric Company
 Continuation of application Ser. No. 754,598, Aug. 28, 1968, now abandoned. This application July 29, 1970, Ser. No. 64,110

[54] DISC-TYPE INDUCTOR EDDY CURRENT MACHINE
 5 Claims, 4 Drawing Figs.

[52] U.S. Cl............................................. 310/93, 310/268
[51] Int. Cl........................................... H02k 49/02
[50] Field of Search................................. 310/268, 166, 93

[56] References Cited
UNITED STATES PATENTS
2,632,859 3/1953 Bessiere ..................... 310/93
2,806,158 9/1957 Emery et al................. 310/268 X Primary Examiner—D. F. Duggan
Attorneys—James C. Davis, Jr., Edward W. Goebel, Jr., Oscar B. Waddell, Melvin M. Goldenberg and Frank L. Neuhauser ABSTRACT: A disc-type inductor eddy current machine having pole pieces or teeth on the opposite sides of a spinning disc, the teeth being specially arranged to provide increased torque at less than the optimum speed of rotation of the disc.

INVENTOR
JAMES E. BUNNER

DISC-TYPE INDUCTOR EDDY CURRENT MACHINE

This application is a continuation of Ser. No. 754,598, filed Aug. 28, 1968, now abandoned.

BACKGROUND OF THE INVENTION

This invention relates to disc-type inductor eddy current machines and more particularly to a special arrangement of pole pieces or teeth for such a machine. The invention is illustrated and described hereinafter with particular reference to an eddy current dynamometer, although many of its features are applicable to other eddy current machines.

The basic components of the well-known inductor type eddy current dynamoelectric machine comprise relatively rotatable members, i.e., a stator and a rotor, and an excitation coil or like means which can be mounted on either member. The stator is cradled in antifriction bearings, and the rotor is mounted in suitable antifriction bearings carried by the stator and is rotated by an external tested mechanism such as an engine. In the case of a dynamometer, where it is desired to measure the output torque of the external engine, the stator is constrained against rotation by torque measuring means.

Most commercial dynamoelectric machines of the foregoing type have heretofore been of what may be referred to as the cylindrical type in which the magnetic flux travels in a radial direction through an airgap between the spinning rotor and the surrounding stator. It has also been proposed to provide disc-type machines in which a relatively thin disc with substantially flat faces in radial planes spins between stator structures and the magnetic flux travels in an axial direction through airgaps between these stator structures and the intermediate, relatively rotatable disc. An illustration of such prior proposals is found in the U.S. Pat. of A. C. Hugin, No. 2,453,509 granted Nov. 9, 1948.

In both of these types of dynamoelectric machines, the pole pieces or teeth can be variously arranged to concentrate and direct the magnetic flux in desired paths as it flows through the airgaps. In the cylindrical type, for example, there may be a plurality of circumferentially spaced teeth around the circumference of the spinning rotor, the magnetic flux flowing in a radial direction through the air gap. In the disc-type machine, a plurality of teeth are disposed on radii that are angularly spaced around the axis of rotation of the machine, these teeth projecting axially from the stator structure toward each of the flat faces on the opposite sides of the spinning disc. In this case, the path of the magnetic flux between a pole piece on one side of the disc and a pole piece on the other side passes axially through the disc and the air gaps on both sides of the disc.

The speed-torque characteristics of cylindrical eddy current machines have been long established by test and analysis and the effect of the number of teeth and of other machine proportions on the optimum speed for such cylindrical machines is well known. The disc-type inductor eddy current machine having the teeth on opposite sides of the spinning disc aligned axially with one another has essentially identical characteristics. In both cases, the torque-excitation curve is essentially the same for the optimum speed of rotation.

SUMMARY OF THE INVENTION

The principal object of the present invention is to provide a disc-type inductor eddy current machine with a special arrangement of pole pieces or teeth such that the speed-torque characteristics of the machine are altered at speeds below the optimum speed and increased torque is obtained in comparison with either a cylindrical type machine or a disc-type machine having a conventional arrangement of teeth as heretofore proposed.

This improved result is obtained by providing two similar sets of teeth, one on each side of the disc, and aligning the teeth of one set on one side of the disc at least in part with the slots or spaces between the teeth of the other set on the other side of the disc. In contrast to the result obtained when a tooth on one side opposes a tooth on the other side of the disc, the alignment of tooth with slot according to the invention causes the magnetic flux to travel from one tooth not only axially through the disc but also circumferentially to the extent necessary to reach the nonaligned tooth on the opposite side of the disc. The result is lower disc inductance due to eddy current distribution and higher torque at low speeds. At higher speeds nearer to optimum, however, the effective penetration of the magnetic flux wave into the disc is greatly reduced due to a skin effect so that the speed-torque characteristic is essentially the same as that for conventional machines.

The effect of misalignment of the teeth tends to become more pronounced as the disc is made thinner, but on the other hand there is less magnetic cross section to carry the circumferential component of magnetic flux and this fact tends towards magnetic saturation. Accordingly, an optimum value or range of values exists as a compromise between these opposing effects, but this optimum is not very sharp and the designer can make use of the invention with machine proportions that will satisfy the various limitations of practical thickness, mechanical strength, optimum speed, etc. The preferred thickness or range of thickness of the disc can be expressed in terms of the relationship between its thickness and the width of a tooth as hereinafter described.

BRIEF DESCRIPTION OF THE DRAWINGS

One embodiment of the invention has been illustrated in the accompanying drawings, but it is to be understood that said drawings are for purposes of illustration only and are not to be construed as a definition of the limits of the invention.

In said drawings.

DESCRIPTION OF THE PREFERRED EMBODIMENT

Figure 1:
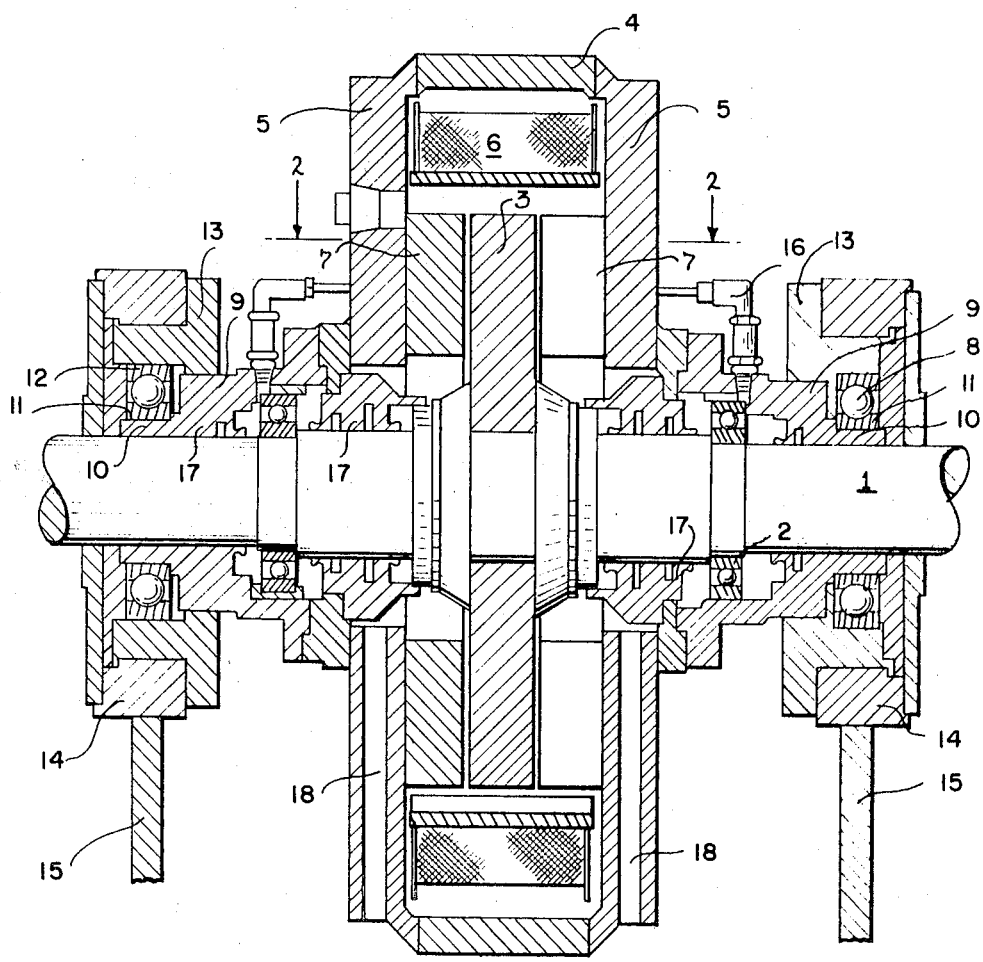
FIG. 1 is a somewhat diagrammatic representation of a dynamometer construction embodying the present invention as summarized above.

Referring to FIG. 1, a rotor shaft 1, which is driven by some external engine or the like that is to be tested, extends through the stator structure and carries the spinning disc as hereinafter described. The shaft 1 rotates in antifriction bearings here shown as ball bearings 2 between the stator structure and the rotor shaft 1. A spinning disc 3 having flat parallel faces in radial planes constitutes the inductor member of this particular embodiment, this disc being mounted on the shaft 1 to rotate therewith in any suitable manner.

It will be understood from the foregoing summary of the invention that the mechanical details of the embodiment shown are not part of the invention. As shown, the stator is built up of a ring 4 to which end plates 5 are secured by welding or otherwise and between which a suitable excitation coil structure 6 is mounted. The stator end plates 5 are provided with suitable openings through which the rotor shaft 1 extends, and each end plate 5 carries a series or set of pole pieces or teeth 7 that are arranged radially with respect to the axis of rotation of the shaft 1 and that project axially from each end plate 5 toward the adjacent flat face of the spinning disc 3.

The stator is cradled in suitable antifriction bearings here shown as ball bearings 8. The details of construction are not material to the present invention, but for purposes of illustration, each stator end plate 5 may have mounted thereon a trunnion structure 9 having a nose 10 surrounding the rotor shaft 1, the inner bearing race 11 of each ball bearing 8 being mounted on the nose 10 and the outer bearing race 12 being mounted in an adapter ring 13 which in turn is mounted in a split support ring 14 carried by a pedestal 15. The bearings themselves may as an alternative be of the oil lubricated, hydrostatic sleeve type or any other suitable type, if desired.

Oil lubrication and cooling may be supplied to the bearing 2 through a suitable supply line 16. Leakage along the shaft 1 in either direction from this bearing is prevented by suitable means such as seals 17 here shown as being of the labyrinth type. As is well known, the energy absorbed in such a machine results in the necessity for cooling the parts and this may be accomplished by means of cooling liquid passages 18 to which a desired cooling liquid, usually water, is supplied in any suitable manner.

As already stated in the summary of invention, one set of teeth 7 is displaced angularly with respect to the other set of teeth 7 so that each tooth of one set is misaligned axially with the corresponding tooth of the other set, and instead is aligned at least in part with a slot between teeth of the other set. This is shown in FIG. 1, for a machine with an even number of teeth 7, by the cross hatching of the teeth 7 in that a line cutting directly through the (cross hatched) teeth on the left hand side of the machine does not cut through those (not cross hatched) on the right hand side. Such an arrangement is also illustrated diagrammatically in FIG. 2, looking in a downward direction from the line 2—2, in which the stator carries a set of teeth 19 which are aligned with spaces 20 between another set of teeth 21 also carried by the stator. A disc 22 spins between the relatively stationary teeth 19 and 21, with intermediate airgaps 23 and 24, respectively, between the sets of teeth 19 and 21 and the faces of the disc.

Figure 2:
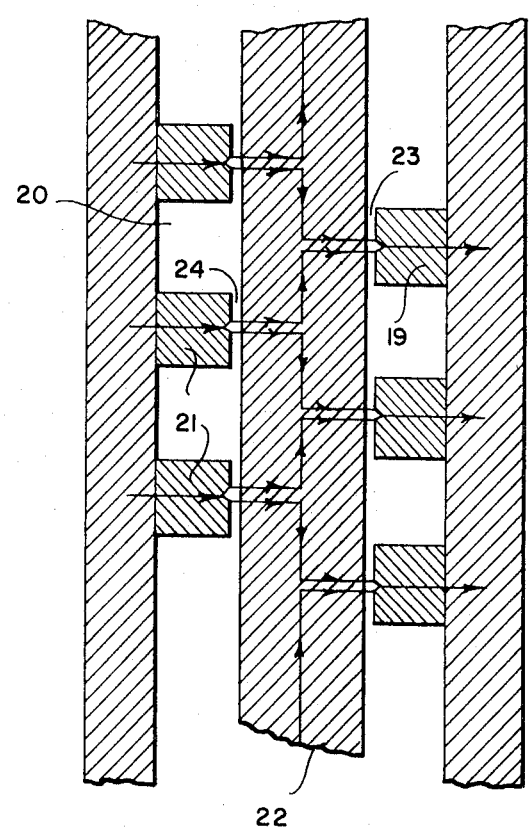
FIG. 2 is taken looking in a downward direction from the line 2—2 in FIG. 1 and illustrates diagrammatically the arrangement of the teeth and slots on opposite sides of the spinning disc, together with the magnetic flux paths from tooth to tooth through the disc.

When the machine is operated, the magnetic flux passes from the teeth 21 (for example) to the teeth 19 along paths indicated diagrammatically by the arrows in FIG. 2. The flux leaving each tooth 21 passes through the air gap 24 and into the disc 22 and then divides and moves circumferentially in both directions far enough for it to reach the adjacent teeth 19 after passing through the air gap 23.

Thus the mean magnetic flux line follows a partially circumferential path from a tooth on one side such as 21 to a tooth on the other side such as 19. This change in path, as compared to a machine in which pole pieces such as 21 and 19 are aligned axially and the magnetic flux follows a straight axial path between the teeth, produces the effect of lower disc inductance due to the eddy current distribution, and this in turn provides higher torque at lower speeds.

Figure 3:
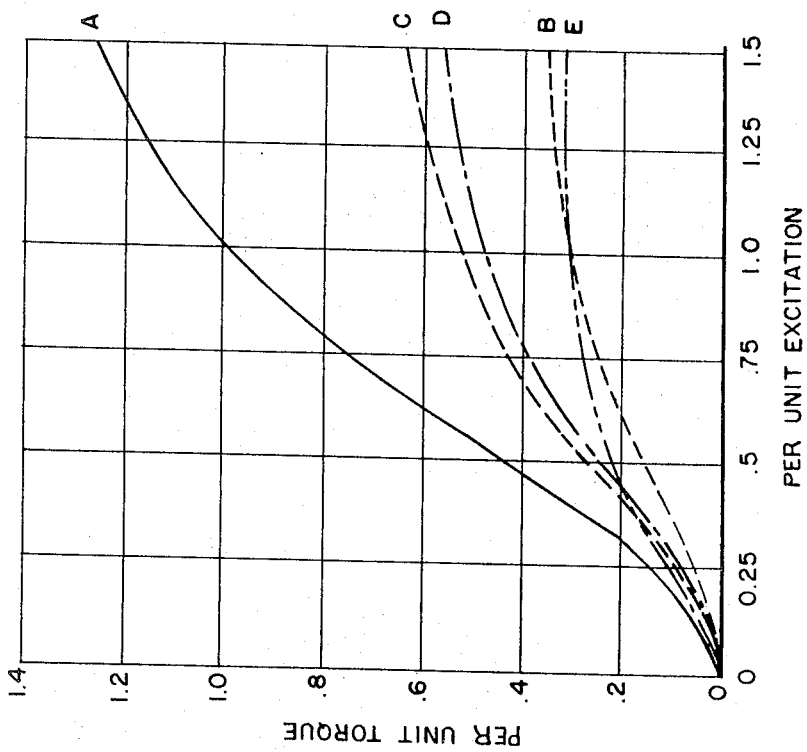
FIG. 3 is a set of curves in which values of excitation are plotted as abscissae and values of torque as ordinates.

The curves of FIG. 3, in which excitation is plotted against torque for optimum speeds, where maximum torque is obtained for a given excitation, and for less than optimum speeds, illustrate the effect described above. In this figure, curve A is typical of the known characteristics at optimum speed of machines of the cylindrical type and also of the disc type in which the teeth on opposite sides of the disc are aligned axially. Similarly, curve B represents the characteristics of such machines at one-tenth of the optimum speed. These prior types have essentially identical characteristics at both optimum and less than optimum speeds.

The effect at less than optimum speeds of misalignment of teeth in the disc type machine is illustrated by curves C, D and E, together with the effect of variations in thickness of the disc in relation to the width of the teeth 19 and 21 measured along the circumference of the disc 22, the width comprising the length of the circumferential arc covered from one space or slot 20 to another by any one tooth. In each of these curves, the speed was one-tenth of optimum speed, as in curve B. With maximum misalignment of the teeth illustrated in FIG. 2, and with a disc thickness equal to one-third of the width of a tooth measured along the circumference of the disc (not shown to scale in FIG. 2), the torque values plotted in curve C are obtained and are substantially higher than those of curve B where the teeth are aligned.

Curve D shows the effect of doubling the thickness of the spinning disc, i.e., increasing it to two-thirds of the width of a tooth measured along the circumference of the disc. The desired effect is reduced somewhat, showing that this thickness is somewhat greater than optimum. Curve E, where the thickness of the disc is half that of curve C, i.e., only one-sixth of the width of a tooth measured along the circumference of the disc 22, shows that at high excitations the effect of misalignment may be overcome by the effect of magnetic saturation, although at lower excitations curve E is higher than curve B and again illustrates the advantages of the present invention.

Figure 4:
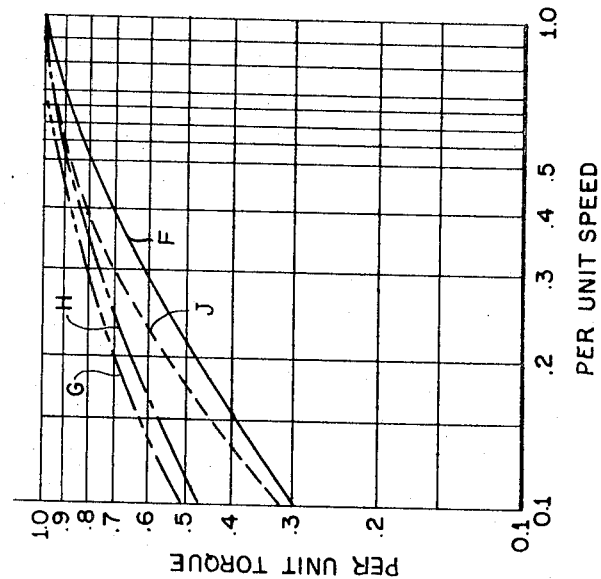
FIG. 4 is another set of curves in which values of input speed are plotted as abscissae and values of torque as ordinates, with the machine excitation held constant.

In FIG. 4, the input speed is plotted on a logarithmic scale against torque for the constant excitation of the machine. The machine from which curve F was derived is of the same physical type as the machine from which curve A of FIG. 3 was derived, and thus curve F is representative of the results obtained either from cylindrical type machines or from disc-type machines in which the teeth are aligned axially. Curves G, H and J of FIG. 4 were derived from the same machines as curves C, D and E, respectively, of FIG. 3. The curves G, H and J illustrate the increased torque that is obtained at less than optimum speeds by the use of the present invention, as well as illustrating the effects of changing the ratio of the width of the teeth with respect to the thickness of the disc of the machine.

The curves of FIGS. 3 and 4 are based on maximum misalignment of teeth, but intermediate degrees of misalignment also produce the benefits of the invention to an intermediate extent. Any significant misalignment produces the benefits of the invention to an appreciable and material extent.

This invention is not limited to details shown in the preferred embodiment which is illustrated and described herein. Those skilled in the art will recognize that many modifications can be made to this disc-type inductor eddy current machine within the spirit and scope of this invention. For example, the surfaces of both sides of the spinning disc 3 of FIG. 1 could be sloped toward the center of the disc as the disc extends radially away from the shaft 1 so that the substantially smooth surfaces of revolution on both sides of the disc are not in radial planes of the disc.

It is thus intended that the appended claims cover modifications and applications of eddy current machines which are within the spirit and scope of this invention.

What I claim as new and desire to secure by Letters Patent of the United States is:

1. In a disc-type inductor eddy current machine of the type having a rotor in the form of a spinning disc with substantially flat surfaces in radial planes, a stator structure including two similar sets of pole pieces disposed on radii angularly spaced around the axis of rotation of said machine, one of said sets on each side of said disc, said pole pieces projecting toward the adjacent disc surfaces but being spaced axially therefrom by airgaps, and excitation means generating a magnetic field which causes all of said pole pieces of one of said sets of pole pieces to be of one magnetic polarity and all of said pole pieces of the other of said sets of pole pieces to be of the opposite magnetic polarity to establish magnetic flux passing from said pole pieces on one side of said disc to those on the other side of said disc along paths passing through said airgaps and said disc, the improvement which comprises displacement of one of said sets of pole pieces angularly with respect to the other of said sets so that corresponding pole pieces of said two sets are significantly misaligned axially, the thickness of said disc being between one-sixth and two-thirds of the width of one of said pole pieces, the width being measured along the circumference of said disc.

2. In a disc-type inductor eddy current machine of the type having a rotor in the form of a spinning disc with substantially flat surfaces in radial planes, a stator structure including two similar sets of pole pieces disposed on radii angularly spaced around the axis of rotation of said machine, one of said sets on each side of said disc, said pole pieces projecting toward the adjacent disc surfaces but being spaced axially therefrom by airgaps, and excitation means generating a magnetic field which causes all of said pole pieces of one of said sets of pole pieces to be of one magnetic polarity and all of said pole pieces of the other of said sets of pole pieces to be of the opposite magnetic polarity to establish magnetic flux passing from said pole pieces on one side of said disc to those on the other side of said disc along paths passing through said airgaps and said disc, the improvement which comprises displacement of one of said sets of pole pieces angularly with respect to the other of said sets so that corresponding pole pieces of said two sets are significantly misaligned axially, the thickness of said disc being approximately one-third of the width of one of said pole pieces, the width being measured along the circumference of said disc.

3. A disc-type inductor eddy current machine of the type having a rotor in the form of a spinning disc having substantially smooth surfaces of revolution on each side thereof, a stator structure including two similar sets of pole pieces disposed on radii angularly spaced around the axis of rotation of said machine, one of said sets on each side of said disc, said pole pieces projecting toward adjacent disc surfaces but being spaced axially therefrom by airgaps, and excitation means generating a magnetic field which causes all of said pole pieces of one of said sets of pole pieces to be of one magnetic polarity and all of said pole pieces of the other of said sets of pole pieces to be of the opposite magnetic polarity to establish magnetic flux passing from said pole piece on one side of said disc to those on the other side of said disc along paths passing through said disc, the improvement which comprises displacement of one of said sets of pole pieces angularly with respect to the other of said sets so that a significant axial misalignment of corresponding pole pieces of said two sets occurs to cause flux from a pole piece of one of said sets of pole pieces to travel in a circumferential direction through said disc prior to passing through a corresponding pole piece on the other of said sets to increase the torque of said machine at speeds less than the optimum speed for any unit of excitation, the thickness of said disc being between one-sixth and two-thirds of the width of one of said pole pieces, the width being measured along the circumference of said disc.

4. A disc-type inductor eddy current machine of the type having a rotor in the form of a spinning disc having substantially smooth surfaces of revolution on each side thereof, a stator structure including two similar sets of pole pieces disposed on radii angularly spaced around the axis of rotation of said machine, one of said sets on each side of said disc, said pole pieces projecting toward adjacent disc surfaces but being spaced axially therefrom by airgaps, and excitation means generating a magnetic filed which causes all of said pole pieces of one of said sets of pole pieces to be of one magnetic polarity and all of said pole pieces of the other of said sets of pole pieces to be of the opposite magnetic polarity to establish magnetic flux passing from said pole pieces on one side of said disc to those on the other side of said disc along paths passing through said disc, the improvement which comprises displacement of one of said sets of pole pieces angularly with respect to the other of said sets so that a significant axial misalignment of corresponding pole pieces of said two sets occurs to cause flux from a pole piece of one of said sets of pole pieces to travel in a circumferential direction through said disc prior to passing through a corresponding pole piece on the other of said sets to increase the torque of said machine at speeds less than the optimum speed for any unit of excitation, the thickness of said disc being approximately one-third of the width of one of said pole pieces, the width being measured along the circumference of said disc.

5. A disc-type inductor eddy current machine of the type having a rotor in the form of a spinning disc having substantially smooth surfaces of revolution on each side thereof, a stator structure including two similar sets of pole pieces disposed on radii angularly spaced around the axis of rotation of said machine with adjacent pole pieces of each of said sets separated by slots, one of said sets of pole pieces being disposed on each side of said disc, said pole pieces projecting toward adjacent disc surfaces but being spaced axially therefrom by airgaps and the thickness of said disc being between one-sixth and two-thirds of the width of one of said pole pieces measured from slot to slot along the circumference of said disc, excitation means generating a magnetic field which causes all of said pole pieces of one of said sets of pole pieces to be of one magnetic polarity and all of said pole pieces of the other of said sets of pole pieces to be of the opposite magnetic polarity to establish a flux path passing from said pole pieces on one side of said disc to those on the other side of said disc along paths passing through said disc, with said pole pieces of one of said sets at least partially aligned with the slots between the pole pieces of the other of said sets on the other side of said disc so that the flux travels in a circumferential direction through said disc as it passes through corresponding pole pieces on either side of said disc.

* * * * *